United States Patent [19]

Parkes

[11] 4,231,470
[45] Nov. 4, 1980

[54] CONVEYOR SYSTEM
[75] Inventor: Ralph C. Parkes, Rydal, Pa.
[73] Assignee: National Drying Machinery Company, Philadelphia, Pa.
[21] Appl. No.: 853,310
[22] Filed: Nov. 21, 1977
[51] Int. Cl.² ............................................. B65G 21/14
[52] U.S. Cl. .................... 198/797; 34/121; 34/203; 99/443 C; 198/812; 432/239
[58] Field of Search ........................ 198/797, 799, 812; 432/239; 99/443C; 34/121, 203

[56] References Cited

U.S. PATENT DOCUMENTS

| | | | |
|---|---|---|---|
| 1,663,746 | 3/1928 | Baker et al. | 198/797 |
| 2,933,176 | 4/1960 | Mansson | 198/799 |
| 3,101,143 | 8/1963 | Valentyne et al. | 198/797 |
| 3,682,363 | 8/1972 | Hull | 226/118 |
| 3,804,583 | 4/1974 | Parkes | 198/796 |

*Primary Examiner*—Jeffrey V. Nase
*Attorney, Agent, or Firm*—Weiser, Stapler & Spivak

[57] ABSTRACT

A conveyor system of the type which may be utilized with an apparatus comprising a plurality of treatment areas such as an oven system containing a proofer for conditioning dough and a baking oven downstream of the proofer for baking the conditioned dough. A plurality of carrying pans are attached to a conveyor that is continuously directed through the proofer and baking oven in a serpentine path. The residence time for a pan within either the proofer or the baking oven can be varied by a conveyor length adjustment system that functions to provide changes in length of the conveyor in the proofer and in the baking oven. The conveyor system comprises movable sprocket assemblies positioned within the proofer and within the oven. The sprocket assemblies are movable in equal and opposite directions for respective length adjustment of the conveyor within the proofer and the oven.

8 Claims, 4 Drawing Figures

FIG. 1

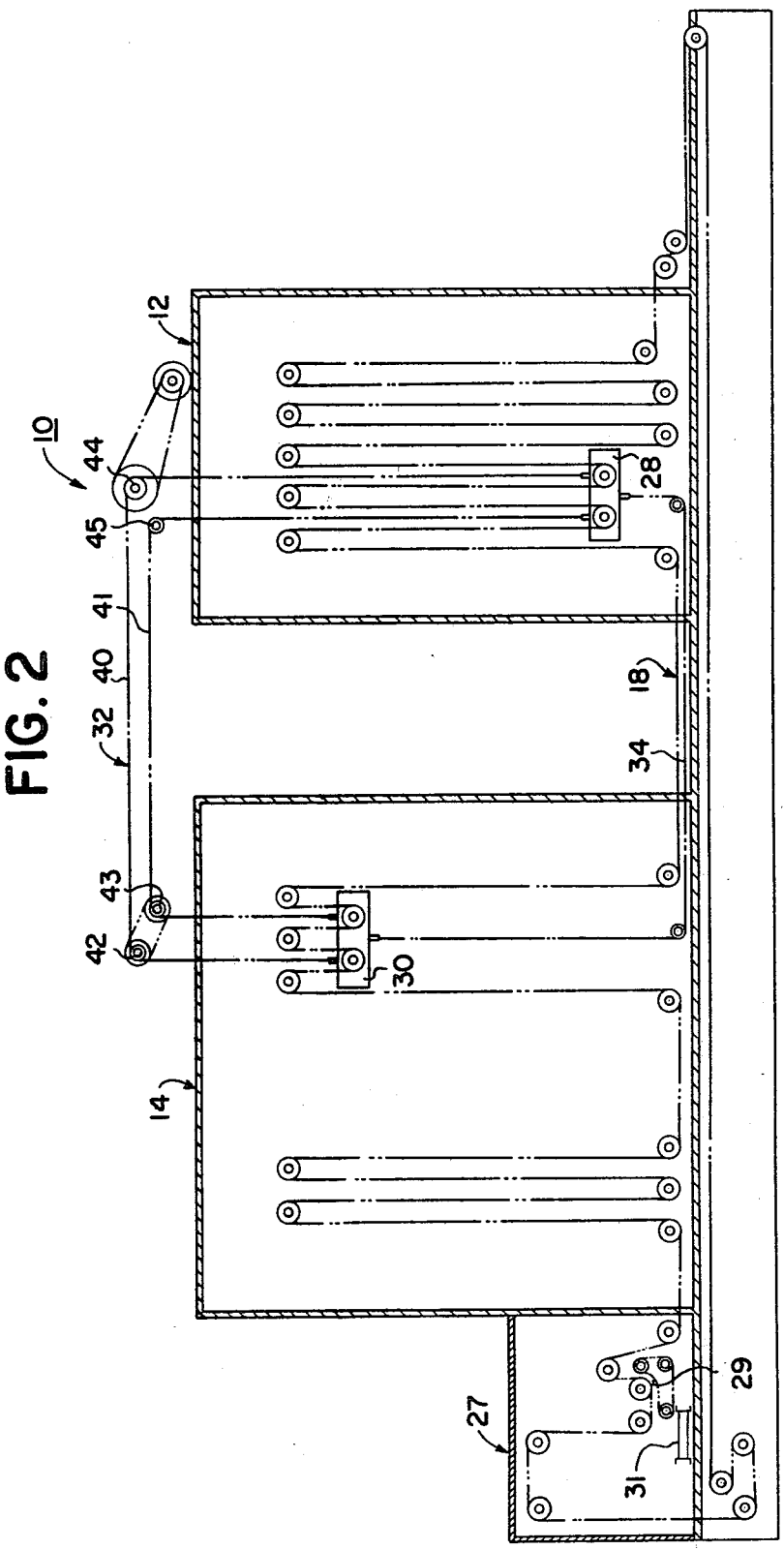

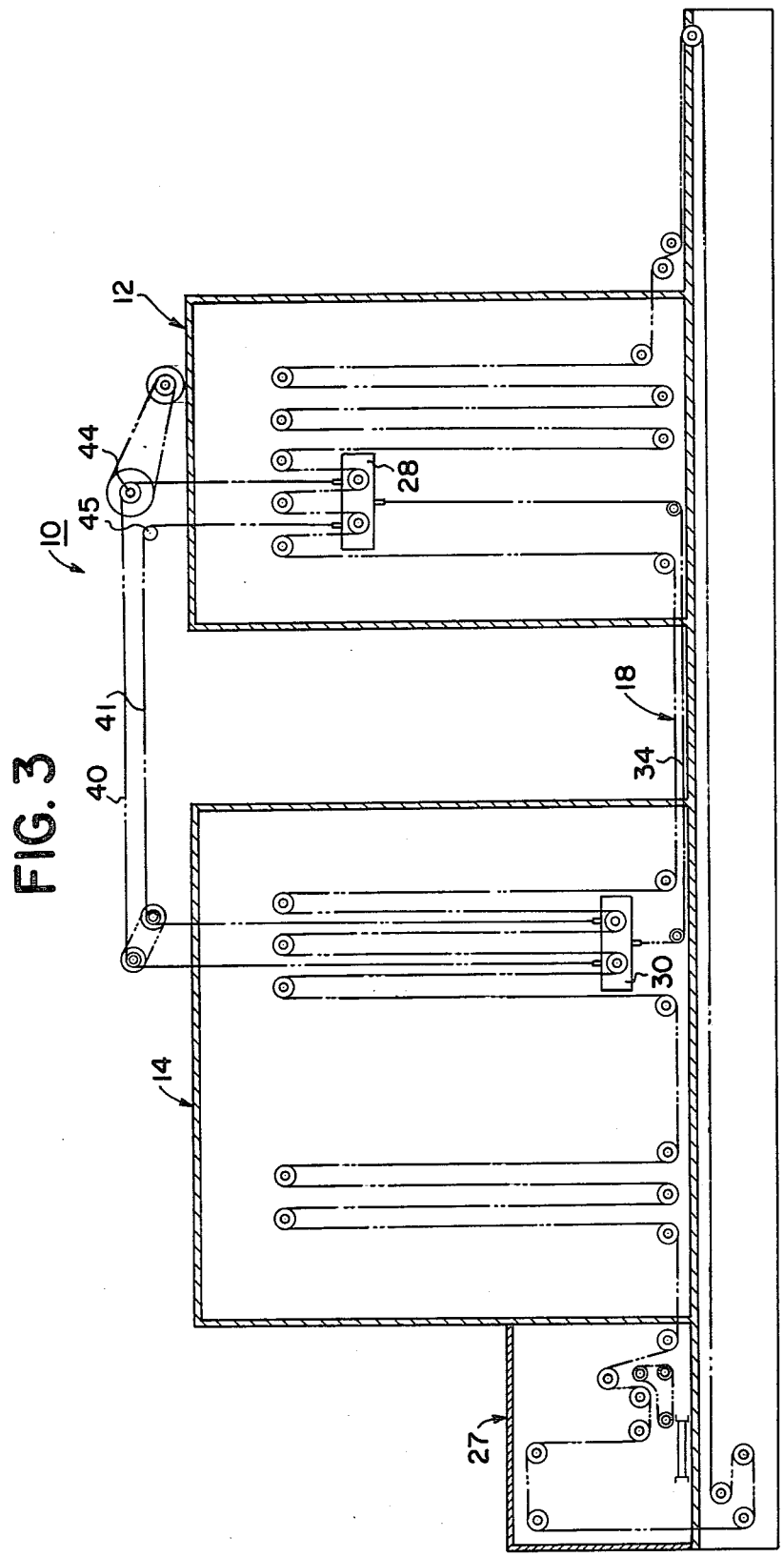

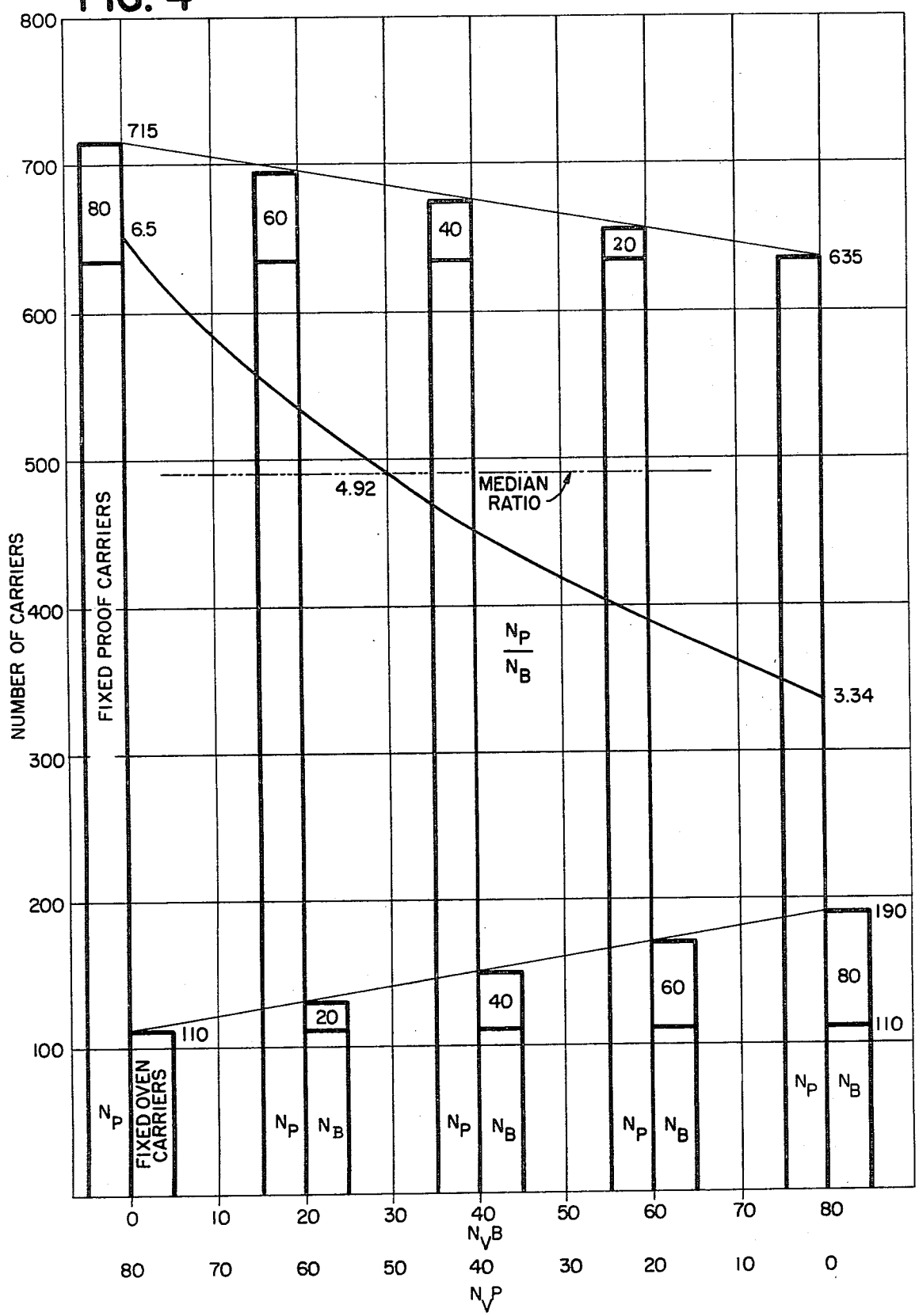

CONVEYOR SYSTEM

BACKGROUND OF THE INVENTION

This invention relates generally to a conveyor system, and more specifically, in one embodiment, to a conveyor system within a baking apparatus including at least a proofer for conditioning dough and a baking oven for baking the dough after it has been conditioned.

Baking systems of the type including a proofer for conditioning dough prior to the baking operation are in common use for making a wide variety of different dough products (e.g., hard rolls, cinnamon rolls, danish pastries, pies, etc.). As illustrated in U.S. Pat. No. 3,804,583, entitled "Baking Oven", which patent has been assigned to the assignee of this application, a conveyor system has been disclosed which carries the dough to be baked in a serpentine path through the apparatus. A serious deficiency existing in such prior art systems is that operators were unable to vary the ratio between the proofing and baking times in a simple, reliable and economical manner. For example, if the conveyor was operated either slower or faster, such action would result in the corresponding speeding or slowing of the time the product remained in both the proofer and the oven. This seriously detracts from the versatility of a system since it could not be easily employed to bake a wide variety of products requiring different ratios of proofing to baking times. The difficulty in varying this ratio is compounded by the fact that a continuous conveyor is employed to direct the baking pans containing the dough through the proofing and baking ovens. Therefore, merely increasing or decreasing the speed of the conveyor will not change the ratio of baking time to proofing time. If this ratio could be changed in an easy and reliable manner, the versatility of the baking system would be greatly enhanced. For example, wet products such as pies usually require a longer baking time than other drier products, such as rolls. Accordingly, once a conveyor was designed for larger ratios of baking to proofing time, it could not easily be changed to accommodate a different product. It is to such a system that the instant invention is directed.

SUMMARY OF THE INVENTION

The conveyor system of this invention employs a continuous conveyor to direct a plurality of baking pans through at least one proofer and ultimately through a baking oven. In accordance with this invention the ratio between proofing time and baking time is varied by changing the length of the conveyor in the proofer and baking oven. This is achieved by a unique conveyor length adjustment system including movable sprocket assemblies that provide for equal and opposite changes in length of the segments of the conveyor in the proofer and the baking oven. In other words, an increase in conveyor length in the proofer is accompanied by a corresponding decrease in conveyor length in the baking oven. Likewise, a decrease in conveyor length in the proofer is accompanied by a corresponding increase in conveyor length in the baking oven. Inasmuch as the time the product remains in the proofer or oven is a direct function of the length of the conveyor within the proofer or oven, the system can be easily and quickly varied to change the ratio between baking and proofing times as is necessary to make a wide variety of different products.

It is therefore an object of the present invention to provide an improved conveyor system of the type set forth.

It is another object of this invention to provide a conveyor system in which the ratio between proofing time and baking time can be changed in a simple, economical and reliable manner.

It is a further object of this invention to provide a conveyor system for use within a baking system in which an increase in baking time is accompanied by a corresponding decrease in proofing time.

It is a further object of this invention to provide a conveyor system for use within a baking system in which a decrease in baking time is accompanied by a corresponding increase in proofing time.

It is a further object of this invention to provide a conveyor system in which the residence time of baking pans in a proofer and baking oven is varied by changing the path length of travel of the pans respectively in the proofer and in the oven.

Other objects and a fuller understanding of the invention will be had by referring to the following description and claims of a preferred embodiment thereof, taken in conjunction with the accompanying drawings, wherein like reference characters refer to similar parts through the several views, and in which:

BRIEF DESCRIPTION OF THE DRAWINGS

FIG. 1 is a schematic side elevation view of a conveyor system of this invention with the conveyor being of an intermediate length in both a proofer and in a baking oven;

FIG. 2 is a schematic side elevation view similar to FIG. 1, but with the conveyor section in the proofer being of a maximum length, and the conveyor section in the baking oven being of a minimum length.

FIG. 3 is a schematic side elevation view similar to FIG. 1, but with the conveyor section in the proofer being of a minimum length, and the conveyor section in the baking oven being of a maximum length.

FIG. 4 is a graph illustrating the ratio of the number of pans within a proofer and within an oven when the respective lengths of the portions of the conveyor are varied through the range illustrated in FIGS. 1-3.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Figure 1:
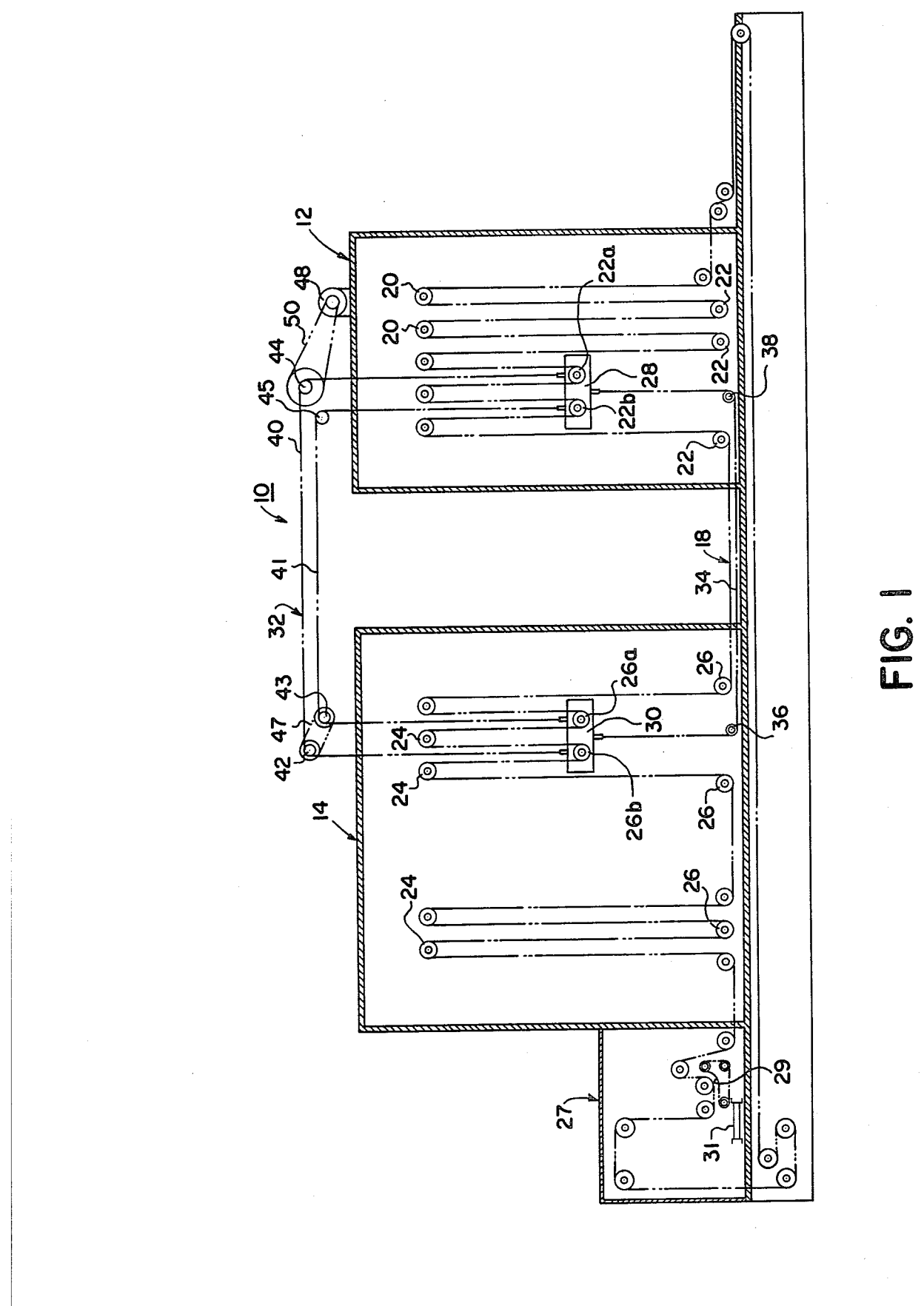

Referring to FIG. 1, the conveyor system is illustrated in use within a baking system or machine 10 in accordance with this invention. It will be understood that although the conveyor system of the present invention is illustrated in use within a baking system, other environments and other applications are contemplated within which the conveyor system may find utility. Accordingly, the present invention should not be limited to baking ovens, but rather should be considered as including all apparatus, wherein variation in the ratio of time is desirable.

As illustrated, machine 10 includes at least one compartment which may be a proofer as indicated at 12, and at least a second compartment or enclosure such as a baking oven 14 downstream from the proofer. A plurality of baking pans, or carriers (not shown), extend across the width of the proofer and baking oven in a well-known manner, and are carried by a continuous conveyor 18. The conveyor 18 is positively driven by any suitable source (not shown) in known manner and is directed in a serpentine path through the proofer 12 and the baking oven 14. Specifically, the conveyor 18 is trained about a plurality of upper sprockets 20 and a plurality of vertically spaced lower sprockets 22 in the proofer. In like manner, the conveyor is trained about a plurality of upper sprockets 24 and a plurality of vertically spaced lower sprockets 26 in the baking oven 14.

After the dough pieces are baked in the oven 14, they are directed to a removal chamber 27, where they are dumped from the baking pans onto a transfer conveyor 29. The transfer conveyor 29 then directs the baked goods to a take-away conveyor 31. The arrangement of elements in the removal chamber 27 does not form a part of the present invention, and can be of any desired design. For a more detailed description of a suitable removal system, reference should be had to U.S. Pat. No. 3,941,232, issued on Mar. 2, 1976 to Ralph C. Parkes.

In accordance with a unique feature of this invention, some of the lower sprockets 22a, 22b in the proofer 12 and some of the lower sprockets 26a, 26b in the baking oven 14 can be moved relative to the respective upper sprockets 20, 24 to shift segments of the conveyor between the proofer and baking oven to vary the conveyor length respectively therein. In the embodiment illustrated, two of the lower sprockets 22a and 22b in the proofer are rotatably mounted in a vertically adjustable support or sprocket assembly 28. In a like manner, two of the lower sprockets 26a and 26b in the baking oven are rotatably mounted to a vertically adjustable sprocket assembly or support 30.

A closed loop, conveyor length adjustment system 32 is provided to control the position of the vertically adjustable supports 28 and 30 respectively, to shift segments of the continuous conveyor 18 between the proofer 12 and the baking oven 14, as will be described in greater detail hereinafter.

The closed loop system 32 includes a lower connecting cable 34 which is trained about idler rolls 36 and 38 and is bottomly connected to the vertically adjustable movable sprocket assemblies or supports 28 and 30. The upper portion of the loop is completed by a pair of upper connecting cables 40, 41 that are upwardly connected to the vertically adjustable supports. In addition, the cable 40 is trained over an idler roll 42 and power driven roll 44. The roll 44 may be rotatively powered by connecting it to motor 48 through a drive belt 50. The second upper connecting cable is trained over the idlers 43, 45. Roll 43 is driven by its chain connection 47 with a sprocket rotated by the idler roll 42. In this manner, the cables 40, 41 are simultaneously driven by a common power source 48.

Referring to FIGS. 2–4, an exemplary embodiment of this invention will be described to illustrate the unique benefits that can be achieved with the instant invention. As shown in U.S. Pat. No. 3,804,583, a plurality of baking pans are carried by the conveyor. In this embodiment, a minimum of 635 baking pans, or carriers, are maintained in the proofer, and a minimum of 110 baking pans, or carriers, are maintained in the baking oven. An additional 80 adjustable pans can be shifted between the baking oven and the proofer depending upon the length of the conveyor segments in each unit.

FIG. 2 shows one extreme condition of the conveyor length adjustment system 32. In this condition the maximum length of conveyor is in the proofer 12, and the minimum length of conveyor is in the baking oven 14. In this condition all 80 of the variably positionable baking pans are located in the proofer. This condition is achieved by lowering the sprocket assembly 28 to its lowermost position within proofer 12, thereby increasing the length of conveyor 18 that is exposed within the proofer. Simultaneously, the length adjustment system 32 functions to elevate the sprocket assembly 30 within the baking oven to its uppermost position of travel. In this manner, the length of conveyor 18 that is exposed within the oven 14 is minimized.

The condition shown in FIG. 2 is graphically illustrated by the double bar at the extreme left of the graph in FIG. 4. The graph illustrated in FIG. 4 plots the total number of carriers or pans located in the proofer 12 ($N_P$) and in the baking oven 14 ($N_B$) as a function of the number of variably positioned pans that are located in the proofer ($N_vP$) and in the baking oven ($N_VB$). The double bar shown at the extreme left of the graph illustrates the condition wherein all 80 of the variably positionable pans are located in the proofer. In this condition the proofer contains a total of 715 pans (the original 635 pans plus the 80 variably positionable pans), and the baking oven 14 includes its minimun quantity of 110 pans only.

FIG. 3 shows the other extreme condition of the system wherein the maximum length of conveyor 18 is located in the baking oven 14 and the minimum length of conveyor is located in the proofer 12. This condition is indicated graphically in FIG. 4 by the double bar at the extreme right. In this condition, all 80 of the variably positionable pans are in the baking oven 14. Therefore, in this condition, the baking oven 14 contains a total of 190 pans (i.e., the original 110 pans plus the 80 variably positionable pans). In a like manner the number of baking pans in the proofer 12 ($N_P$) is at its minimum quantity of 635 pans.

The three double bars between the extreme left and extreme right double bars in the FIG. 4 graph show the manner in which the number of baking pans in the proofer 12 and baking oven 14 vary as the conveyor length is adjusted from its extreme condition shown in FIG. 2 to its other extreme condition shown in FIG. 3. In addition, the ratio of the number of pans in the proofer ($N_P$) to the number of pans in the baking oven 14 ($N_B$) is also shown ($N_P/N_B$). As can be seen in FIG. 4 this ratio varies from 6.5 when all of the variably positionable pans are located in the proofer 12, to a value of 3.34 when all of the variably positionable pans are located in the baking oven 14.

The change in the ratio ($N_P/N_B$) is indicative of the shifting of segments of the conveyor 18 from the proofer 12 to the baking oven 14. At a given conveyor speed, movement of the ratio ($N_P/N_B$) is representative of the variable ratio of proofing time to baking time. Specifically, as segments of the conveyor 18 are shifted from the proofer 12 to the baking oven 14, the residence time of the baking pans in the baking oven will be increased while the residence time of the baking pans in the proofer will be decreased. Conversely, when segments of the conveyor 18 are shifted from the baking oven 14 to the proofer 12, the proofing time will be increased and the baking time will be corresponding decreased. Accordingly, applicant's system provides a unique arrangement for shifting segments of a continuous conveyor between two locations such as a proofer and a baking oven to permit adjustment of the ratio between the proofing time and baking time.

Although the invention has been described with a certain degree of particularity, it is understood that the present disclosure has been made only by way of example and that numerous changes in the details of construction and the combination and arrangement of parts may be resorted to without departing from the scope of the invention.

What is claimed is:

1. In a conveyor system of the type suitable to transport a plurality of containers through a first environmental area and a second environmental area wherein the conveyor follows a first path about a first plurality of upper sprockets and a first plurality of lower sprockets to define a first conveyor length within the first area and wherein the conveyor follows a second path about a second plurality of upper sprockets and a second plurality of lower sprockets to define a second conveyor length within the second area, the improvement comprising a first conveyor length adjustment means for changing the length of the conveyor in the first area, said first conveyor length adjustment means including first means to move some but not all of said first plurality of lower sprockets, and second length adjustment means including second means to move some but not all of said second plurality of lower sprockets for providing a corresponding, but opposed conveyor length change in the second area, said first conveyor length adjustment means is being associated with the movable ones of said first plurality of lower sprockets for moving them to either increase or decrease the vertical spacing between sprockets in the first area, within preselected limits, and the second conveyor length adjusting means being associated with the movable ones of said second plurality of lower sprockets for moving them to either increase or decrease the vertical spacing between the sprockets in the second area for providing a corresponding, but opposite, increase or decrease in the vertical spacing between sprockets in the second area, whereby, for a given conveyor speed, the ratio of time of a container within the first area to the time of the container within the seccond area can be varied.

2. The system of claim 1 wherein the movable ones of said first plurality of lower sprockets in the first area are rotatably connected to a first vertically movable sprocket support and the movable ones of said second plurality lower sprockets in the second area are rotatably connected to a second vertically movable sprocket support.

3. The conveyor system of claim 2 wherein the first and second conveyor length adjustment include a closed cable loop, the loop comprising an upper cable and a lower cable.

4. The conveyor system of claim 3 wherein the upper cable extends upwardly from each of the first and second vertically movable sprocket supports.

5. The conveyor system of claim 3 wherein the lower cable extends downwardly from each of the first and second vertically movable sprocket supports.

6. The conveyor system of claim 1 adapted for proofing and baking dough pieces wherein the first environmental area comprises a proofer for conditioning dough pieces; wherein the second environmental area comprises a baking oven for baking the conditioned dough pieces; and wherein said plurality of containers are dough carrying pans.

7. The conveyor system of claim 6 wherein the dough carrying pans comprise a first quantity of pans, which first quantity is always present within the proofer, a second quantity of pans, which second quantity is always present within the baking oven; and a third quantity of pans, which third quantity is variably positionable within either the proofer or the oven.

8. The conveyor system of claim 7 wherein the ratio of the first quantity of pans plus a first portion of the third quantity of pans to the second quantity of pans plus the remainder of the third quantity of pans is between 6.5 and 3.34.

* * * * *